(12) United States Patent
Shimamura et al.

(10) Patent No.: US 8,167,975 B2
(45) Date of Patent: May 1, 2012

(54) EXHAUST GAS PURIFYING METHOD AND APPARATUS

(75) Inventors: Jun Shimamura, Hiroshima (JP);
Takanori Nakamoto, Hiroshima (JP);
Toshio Katsube, Hiroshima (JP);
Hirofumi Kikkawa, Hiroshima (JP);
Hiroyuki Nosaka, Hiroshima (JP);
Takayuki Saitou, Hiroshima (JP);
Yoshinori Taguchi, Hiroshima (JP);
Hiroshi Ishizaka, Hiroshima (JP)

(73) Assignee: Babcock-Hitachi Kabushiki Kaisha, Tokyo (JP)

(*) Notice: Subject to any disclaimer, the term of this patent is extended or adjusted under 35 U.S.C. 154(b) by 290 days.

(21) Appl. No.: 12/531,603

(22) PCT Filed: Apr. 11, 2008

(86) PCT No.: PCT/JP2008/057169
§ 371 (c)(1),
(2), (4) Date: Sep. 16, 2009

(87) PCT Pub. No.: WO2008/133044
PCT Pub. Date: Nov. 6, 2008

(65) Prior Publication Data
US 2010/0116126 A1 May 13, 2010

(30) Foreign Application Priority Data
Apr. 13, 2007 (JP) ................. 2007-106195

(51) Int. Cl.
*B01D 53/50* (2006.01)
*B01D 53/64* (2006.01)
(52) U.S. Cl. ............ 95/13; 95/134; 95/137; 95/235; 96/111; 96/134; 96/150; 423/242.1; 110/203
(58) Field of Classification Search ............ 95/13, 107, 95/133, 134, 137, 235; 96/111, 134, 150, 96/371; 423/242.1, 243.01, 243.08, 243.09, 244.01, 244.07, 244.08; 110/203, 215, 216, 345
See application file for complete search history.

(56) References Cited

U.S. PATENT DOCUMENTS
5,624,648 A * 4/1997 Carlsson ............. 423/242.1
(Continued)

FOREIGN PATENT DOCUMENTS
| EP | 405290 | 6/1990 |
|---|---|---|
| EP | 1316352 | 6/2003 |
| GB | 3921578 | 6/1989 |
| JP | 3-052622 | 3/1991 |

(Continued)

OTHER PUBLICATIONS

English language Abstract of EP 0405290, corresponding to DE3921578, published Jun. 1989.

*Primary Examiner* — Frank Lawrence, Jr.
(74) *Attorney, Agent, or Firm* — Greenblum & Bernstein, P.L.C.

(57) ABSTRACT

A system is provided that prevents inhibition of adsorption of Hg and other heavy metals by activated carbon or other heavy metal adsorbent due to prior adsorption of sulfur trioxide ($SO_3$) in an exhaust gas containing $SO_3$. As it has been found that while $SO_3$ is adsorbed, the adsorption of $SO_3$ precedes the adsorption of Hg and other heavy metals onto activated carbon, a basic substance injection system is disposed along an exhaust gas flow channel at an upstream side of an activated carbon injection system, thereby attaining effective removal of Hg and other heavy metals from the exhaust gas by adsorption thereof onto surface pores of the activated carbon. The $SO_3$ concentration after removal by basic substance conversion is computed from the $SO_3$ concentration before removal, and the activated carbon injection rate can be controlled based on the concentration after removal.

4 Claims, 8 Drawing Sheets

U.S. PATENT DOCUMENTS

| | | |
|---|---|---|
| 6,638,485 B1 * 10/2003 | Iida et al. | 423/210 |
| 6,913,737 B2 7/2005 | Honjo et al. | |
| 7,628,969 B2 * 12/2009 | Holmes et al. | 423/242.1 |
| 7,651,389 B2 * 1/2010 | Kikkawa et al. | 454/55 |
| 7,722,843 B1 * 5/2010 | Srinivasachar | 423/210 |
| 7,776,141 B2 * 8/2010 | Wu et al. | 96/150 |
| 2010/0071348 A1 * 3/2010 | Kobayashi et al. | 60/276 |

FOREIGN PATENT DOCUMENTS

| | | |
|---|---|---|
| JP | 11-076753 | 3/1999 |
| JP | 2001-198434 | 7/2001 |
| JP | 2003-126654 | 5/2003 |
| JP | 2006-326575 | 12/2006 |
| WO | 03/008072 | 1/2003 |

* cited by examiner

F I G. 4
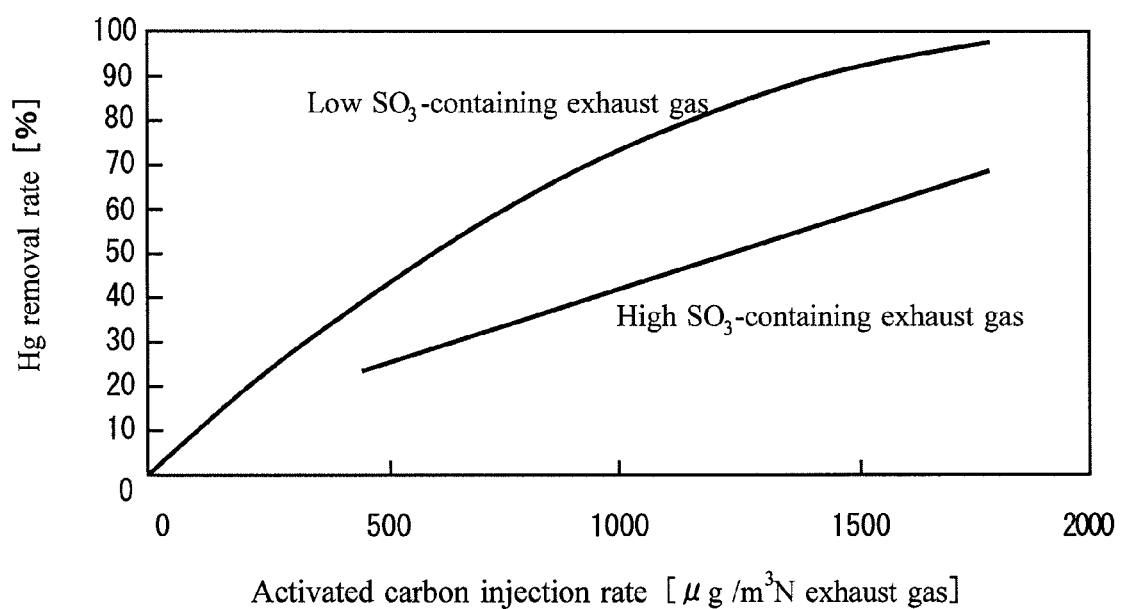

EXHAUST GAS PURIFYING METHOD AND APPARATUS

TECHNICAL FIELD

The present invention relates to an exhaust gas purifying method and apparatus, and particularly relates to a method and an apparatus for removing trace heavy metal components in an exhaust gas.

BACKGROUND ART

Mercury and other heavy metals are contained in addition to nitrogen oxides and sulfur oxides in an exhaust gas discharged from a thermal power plant boiler, etc., which is a combustion apparatus that uses coal or other fossil fuel. Although the nitrogen oxides are removed by NOx removal equipment and the sulfur oxides are removed by a desulfurizer, mercury and other heavy metals cannot be removed by the NOx removal equipment or desulfurizer and cannot be trapped completely by a precipitator for removing soot/dust in the exhaust gas. Mercury and other heavy metals are high in toxicity, and thus emission restrictions thereof have recently become stricter and methods for removing mercury and other heavy metals are being examined.

FIG. 6 is an overall system diagram of a conventional purifying system for the exhaust gas discharged from the abovementioned combustion apparatus. The exhaust gas 2 discharged from the boiler 1 is introduced into NOx removal equipment 3 for removal of the nitrogen oxides (NOx) in the exhaust gas and thereafter heats combustion air 5 for the boiler 1 in an air preheater 4 by heat exchange. A large portion of soot/dust in the exhaust gas is then removed by a dry electric precipitator 6, and the exhaust gas is then raised in pressure and introduced into a wet desulfurizer 8 by an induction fan 7. Sulfur oxide ($SO_2$) in the exhaust gas is removed by gas-liquid contact from the exhaust gas 2 introduced into the wet desulfurizer 8. The exhaust gas 2, which is cooled to a saturation gas temperature in the wet desulfurizer 8, is removed of sulfur trioxide ($SO_3$) mist by a wet electric precipitator 9 and then discharged into air from a chimney 10.

As mentioned above, environmental pollutants contained in the exhaust gas from the boiler 1 that uses coal, etc., as fuel include the sulfur oxides ($SO_2$, $SO_3$), nitrogen oxides (NOx), soot/dust, and mercury (Hg) and other heavy metals, and as purifying equipment, the NOx removal equipment 3 is installed for the NOx, the desulfurizer 8 is installed for sulfur dioxide ($SO_2$), the dry electric precipitator 6 and the desulfurizer 8 are installed for soot/dust, and the wet electric precipitator 9 is installed for sulfur trioxide ($SO_3$).

Also, it is known in regard to sulfur trioxide ($SO_3$) that when a basic substance, containing a sodium component, etc., is blown into the exhaust gas from basic substance injection systems 11 at an upstream side of the NOx removal equipment 3, an upstream side of the air preheater 4, and an upstream side of the dry electric precipitator 6, etc., at a temperature higher than a dew point of sulfur trioxide ($SO_3$) (approximately 130° C. or higher) as shown in FIG. 7, conversion of $SO_3$ to $SO_2$ occurs. In a case where a concentration of sulfur trioxide ($SO_3$) is high and yet an environmental regulation value (legally designated value or voluntary regulation value) is stringent, not only the wet electric precipitator 9 but the above-described method is also adopted in combination in many cases to eliminate sulfur trioxide ($SO_3$) efficiently (for example, Japanese Published Unexamined Patent Application No. 2006-326575).

Meanwhile, generally for Hg and other heavy metals, activated carbon is sprayed from an activated carbon injection system 12 as shown in FIG. 8 to make the Hg and other heavy metals to be adsorbed onto the activated carbon surface, and the Hg and other heavy metals are removed along with the activated carbon by the dry electric precipitator 6.

The exhaust gas purifying systems in the overall system diagrams of FIGS. 7 and 8 have configurations with which the basic substance injection systems 11 and the activated carbon injection system 12 are respectively added to the system diagram described in FIG. 6.

[Patent Document 1] Japanese Published Unexamined Patent Application No. 2006-326575

DISCLOSURE OF THE INVENTION

Problems to be Solved by the Invention

FIG. 4 shows relationships of activated carbon injection rates and mercury (Hg) removal rates according to sulfur trioxide ($SO_3$) concentrations, and from FIG. 4, it is found that when mercury (Hg) and sulfur trioxide ($SO_3$) are co-present, sulfur trioxide ($SO_3$) is adsorbed with priority to the activated carbon.

However, with a conventional system (for example, Japanese Published Unexamined Patent Application No. 2006-326575), the lowering of the mercury (Hg) removal rate due to sulfur trioxide ($SO_3$) is not taken into consideration. That is, in comparison to a case where there is hardly any sulfur trioxide ($SO_3$), the required mercury (Hg) removal rate cannot be obtained in a state where sulfur trioxide ($SO_3$) is co-present, even when activated carbon is used, and especially with an exhaust gas containing a high concentration of sulfur trioxide ($SO_3$), there is a problem that removal cannot be achieved at all even when activated carbon is sprayed.

Also, in the conventional art, the sodium (Na) component, potassium (K) component, etc., contained in the basic substance that is sprayed, are recovered along with the soot/dust in the dry electric precipitator 6. There is thus a problem of lowering of value of the recovered ash.

A theme of the present invention is to provide a system that prevents inhibition of adsorption of Hg and other heavy metals onto activated carbon due to prior adsorption of sulfur trioxide ($SO_3$) in an exhaust gas containing sulfur trioxide ($SO_3$). Another theme of the present invention is to provide a system capable of efficiently removing mercury (Hg) and other heavy metals in consideration of sulfur trioxide ($SO_3$) content in the exhaust gas.

Means for Solving the Problems

The theme of the present invention can be achieved by the following.

A first aspect of the present invention provides an exhaust gas purifying method including the steps of: removing sulfur trioxide ($SO_3$) by spraying a basic substance in a flow channel of an exhaust gas discharged from a combustion apparatus that includes a boiler; thereafter removing soot/dust in the exhaust gas by a dry precipitator; then removing sulfur dioxide ($SO_2$) in the exhaust gas by a desulfurizer; further removing sulfur trioxide ($SO_3$) and soot/dust remaining in the exhaust gas by a wet precipitator; and then discharging the purified exhaust gas into air; and where activated carbon or other heavy metal adsorbent for removing heavy metal components contained in the exhaust gas is sprayed into the exhaust gas after spraying of the basic substance.

A second aspect of the present invention provides the exhaust gas purifying method according to the first aspect where the basic substance and the activated carbon or other heavy metal adsorbent to be sprayed into the exhaust gas are sprayed into an exhaust gas flow channel at a downstream side of the dry precipitator and an upstream side of the desulfurizer.

A third aspect of the present invention provides the exhaust gas purifying method according to the first aspect, further including the steps of: predicting a sulfur trioxide ($SO_3$) concentration in the exhaust gas from an operating load of the combustion apparatus and a composition of a fuel used in the combustion apparatus; computing a basic substance spraying amount in accordance with the predicted value of the sulfur trioxide ($SO_3$) concentration to set the amount of basic substance sprayed into the exhaust gas; and, at the same time, calculating a required heavy metal removal rate from the operating load, a heavy metal concentration in the exhaust gas, and a regulation value of heavy metals in the exhaust gas after the exhaust gas purifying treatment; and setting an activated carbon or other heavy metal adsorbent spraying amount required to be sprayed into the exhaust gas from relationships of the activated carbon or other heavy metal adsorbent spraying amount and the heavy metal removal rate that are determined in advance according to the sulfur trioxide ($SO_3$) concentration.

A fourth aspect of the present invention provides an exhaust gas purifying apparatus including: a basic substance injection system, spraying a basic substance for removing sulfur trioxide ($SO_3$) into a flow channel for an exhaust gas discharged from a combustion apparatus that includes a boiler; a dry precipitator for removing soot/dust in the exhaust gas; a desulfurizer, removing sulfur dioxide ($SO_2$) in the exhaust gas after collection of the soot/dust by the dry precipitator; a wet precipitator for removing sulfur trioxide ($SO_3$) and soot/dust remaining in the exhaust gas; and a chimney, discharging the desulfurized exhaust gas into air; and where an activated carbon or other heavy metal adsorbent injection system is installed at an exhaust gas flow channel at a downstream side of the basic substance injection system.

A fifth aspect of the present invention provides the exhaust gas purifying apparatus according to the fourth aspect where the basic substance injection system and the activated carbon or other heavy metal adsorbent injection system are installed at an exhaust gas flow channel at a downstream side of the dry precipitator and an upstream side of the desulfurizer.

A sixth aspect of the present invention provides the exhaust gas purifying apparatus according to the fourth aspect further including a controller, in turn including: a sulfur trioxide ($SO_3$) concentration predicting unit, predicting a sulfur trioxide ($SO_3$) concentration in the exhaust gas based on an operating load of the combustion apparatus and a composition of a fuel used in the combustion apparatus; a basic substance spraying amount setting unit, setting a basic substance spraying amount in accordance with the predicted value of the sulfur trioxide ($SO_3$) concentration predicted by the sulfur trioxide ($SO_3$) concentration predicting unit; a unit measuring a heavy metal concentration in the exhaust gas at an exit of the combustion apparatus; a required heavy metal concentration removal rate calculating unit, calculating a required heavy metal concentration removal rate, determined by a heavy metal concentration from the heavy metal concentration measuring unit and the load of combustion apparatus from the load measuring unit, and a priorly established regulation value of heavy metal concentration in the exhaust gas after the exhaust gas purifying treatment; and a spraying amount setting unit, computing a heavy metal adsorbent spraying amount from the computed sulfur trioxide ($SO_3$) concentration prediction value at an exhaust gas entrance and the required heavy metal concentration removal rate, calculated by the required heavy metal concentration removal rate calculating unit, and using relationships of the heavy metal adsorbent spraying amount and the heavy metal removal rate, which are determined in advance according to sulfur trioxide ($SO_3$) concentration, to set the heavy metal adsorbent spraying amount and spraying that amount into the exhaust gas.

(Actions)

According to the first and fourth aspects of the present invention, mercury (Hg) and other heavy metals are removed from the exhaust gas by adsorption onto surface pores of the heavy metal adsorbent. Meanwhile, it is found that although sulfur trioxide ($SO_3$) is also adsorbed, the adsorption of $SO_3$ precedes that of Hg and other heavy metals.

The $SO_3$ in the exhaust gas is thus removed first by addition of the basic substance. FIG. 5 shows a relationship of the basic substance spraying amount and the $SO_3$ removal rate, and a majority (80% or higher) of the $SO_3$ can be removed by loading the basic substance with an equivalence ratio of the basic substance with respect to $SO_3$ being set to approximately 2. The $SO_3$ adsorption amount of the heavy metal adsorbent sprayed into the exhaust gas at the downstream side of the portion at which the basic substance is added, is thereby decreased, and activity of the heavy metal adsorbent with respect to adsorption of Hg and other heavy metals is thus not degraded.

According to the second and fifth aspects of the present invention, in addition to providing the actions of the first and fourth aspects of the invention, mixing of the basic substance, containing Na, K, etc., and reaction products into recovered ash in the dry electric precipitator 6 is prevented by disposing the basic substance injection system 11 and the heavy metal adsorbent injection system 12 at the downstream side of the exhaust gas flow channel with respect to the dry electric precipitator 6, and there are thus no problems in regard to recycling of the ash.

According to the third and sixth aspects of the present invention, in addition to providing the actions of the first and fourth aspects of the invention, the heavy metal adsorbent is not used more than necessary because the heavy metal adsorbent spraying amount required for achieving a certain heavy metal removal rate can be determined from the relationships of the sulfur trioxide ($SO_3$) concentration in the exhaust gas after removal by the previously loaded basic substance amount and the heavy metal adsorbent spraying amount.

Besides powder activated carbon, soot/dust recovered ash (coal ash), which exhibits adsorption performance and to which the sulfuric acid mist has not become attached, silica gel, alumina, zeolite, synthetic zeolite, or a metal oxide or resin based adsorbent, etc., may be used as the heavy metal adsorbent for mercury, etc.

Improvement of the trapping performance by application of the present invention is also seen for heavy metals besides mercury, such as selenium (Se), lead (Pb), zinc (Zn), cadmium (Cd), chromium (Cr), arsenic (As), etc.

EFFECTS OF THE INVENTION

According to the first and fourth aspects of the present invention, inhibition of adsorption of heavy metals by the heavy metal adsorbent due to sulfur trioxide ($SO_3$) can be prevented, and heavy metals can thus be removed without being affected much by sulfur trioxide ($SO_3$) in an exhaust gas treating system capable of removing sulfur dioxide ($SO_2$), sulfur trioxide ($SO_3$), hydrogen chloride (HCl), etc.

According to the second and fifth aspects of the present invention, in addition to providing the effects of the first and fourth aspects of the invention, mixing of the basic substance, containing Na, K, etc., and the reaction products into the recovered ash in the dry electric precipitator 6 is prevented by disposing the basic substance injection system 11 and the heavy metal adsorbent injection system 12 at the downstream side of the exhaust gas flow channel with respect to the dry electric precipitator 6, and there are thus no problems in regard to the recycling of the ash.

According to the third and sixth aspects of the present invention, in addition to providing the effects of the first and fourth aspects of the invention, an effect of reducing a usage amount of the heavy metal adsorbent is provided by calculation and control of the required heavy metal adsorbent loading amount from the sulfur trioxide ($SO_3$) concentration in the exhaust gas at the exit of the combustion apparatus and the required heavy metal removal rate.

BEST MODE FOR CARRYING OUT THE INVENTION

Embodiments of the present invention shall now be described along with the drawings.

Embodiment 1

A system of an exhaust gas treating system according to the present embodiment is shown in FIG. 1. An exhaust gas 2 discharged from a boiler 1 is introduced into NOx removal equipment 3 to be removed of nitrogen oxides (NOx) in the exhaust gas and thereafter heats combustion air 5 for the boiler 1 in an air preheater 4 by heat exchange. A large portion of soot/dust in the exhaust gas is then removed by a dry electric precipitator 6, and the exhaust gas is then raised in pressure and introduced into a wet desulfurizer 8 by an induction fan 7. The exhaust gas 2 introduced into the wet desulfurizer 8 is removed of sulfur oxide ($SO_2$) in the exhaust gas by gas-liquid contact. The exhaust gas 2, which is cooled to a saturation gas temperature in the wet desulfurizer 8, is removed of sulfur trioxide ($SO_3$) mist by a wet electric precipitator 9 and then discharged into air from a chimney 10.

In FIG. 1, the points that differ from the conventional examples of FIGS. 6 to 8 are that injection systems 11 for a basic substance (for example, sodium bisulfate) are installed in exhaust gas flow channels at an upstream side and a downstream side of the NOx removal equipment 3 and between the air preheater 4 and the dry electric precipitator 6, an activated carbon injection system 12 is installed at an exhaust gas flow channel between the air preheater 4 and the dry electric precipitator 6, all basic substance injection systems 11 are installed at exhaust gas flow channels at the upstream side of the activated carbon injection system 12, and the basic substance is sprayed from the basic substance injection systems 11 in accordance with an Hg concentration (measured by an Hg concentration meter 13) in the exhaust gas at the exit of the combustion apparatus.

When the sodium bisulfate ($NaHSO_3$) or other basic substance is sprayed into the exhaust gas by the basic substance injection systems 11, the sulfur trioxide ($SO_3$) is reduced to sulfur dioxide ($SO_2$) according to the following formulae (1) and (2):

$$SO_3 + NaHSO_3 \rightarrow NaHSO_4 + SO_2 \tag{1}$$

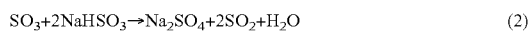

$$SO_3 + 2NaHSO_3 \rightarrow Na_2SO_4 + 2SO_2 + H_2O \tag{2}$$

Also, when a basic substance such as sodium carbonate ($Na_2CO_3$) is sprayed into the exhaust gas by the basic substance injection systems 11, the sulfur trioxide ($SO_3$) is neutralized according to the following formulae (3) and (4):

$$SO_3 + Na_2CO_3 \rightarrow Na_2SO_4 + CO_2 \tag{3}$$

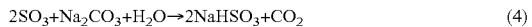

$$2SO_3 + Na_2CO_3 + H_2O \rightarrow 2NaHSO_3 + CO_2 \tag{4}$$

The basic substance sprayed into the exhaust gas from the basic substance injection systems 11 used in the present embodiment include sodium carbonate, sodium bicarbonate, potassium carbonate, potassium bicarbonate, sodium bisulfate, sodium sulfate, etc., which are alkaline.

When the basic substance is loaded by the basic substance injection systems 11 at an equivalence ratio of approximately two with respect to sulfur trioxide ($SO_3$) in the exhaust gas to remove the sulfur trioxide ($SO_3$) in the exhaust gas in advance and the activated carbon or other heavy metal adsorbent is used thereafter, Hg and other heavy metals in the exhaust gas are adsorbed effectively by the activated carbon. Consequently, the sulfur trioxide ($SO_3$) concentration is decreased when the exhaust gas reaches the activated carbon injection system 12, and heavy metal adsorption and removal by the activated carbon are enabled by decrease of the ability of sulfur trioxide ($SO_3$) to inhibit the heavy metal adsorption by the activated carbon.

A control flow sheet of the exhaust gas treating system according to the present embodiment is shown in FIG. 3. By a controller 15, the sulfur trioxide ($SO_3$) concentration is predicted from a fuel composition of coal and an operating load, a basic substance spraying amount is computed according to the predicted value of the sulfur trioxide ($SO_3$) concentration, the computed basic substance spraying amount is set, and at the same time, a required Hg removal rate is calculated from the operating load, the Hg concentration (measured by the Hg concentration meter 13) in the exhaust gas at the exit of the combustion apparatus, and a priorly established regulation value of the Hg concentration in the exhaust gas after the exhaust gas purifying treatment. An activated carbon injection rate is computed from the computed sulfur trioxide ($SO_3$) concentration prediction value at the exhaust gas entrance and the required Hg removal rate, and using relationships, shown in FIG. 4, of the activated carbon injection rate and the Hg removal rate according to sulfur trioxide ($SO_3$) concentration, the loading amount is computed by the controller 15, and a control of spraying the required amount of the activated carbon is performed.

Embodiment 2

An overall system diagram of an exhaust gas treating system according to the present embodiment is shown in FIG. 2. In FIG. 2, portions having the same functions or configurations as those of the conventional example shown in FIGS. 6 to 8 are provided with the same symbols, and description thereof is omitted.

The points by which FIG. 2 differ from FIG. 1 are that the injection system 11 for the basic substance (for example, sodium bisulfate) is installed at an exhaust gas flow channel at the downstream side of the dry electric precipitator 6 and the activated carbon injection system 12 is installed at an exhaust gas flow channel between the induction fan 7 and the wet desulfurizer 8, and the basic substance injection system 11 is thus installed at the exhaust gas flow channel at the upstream side of the activated carbon injection system 12.

As in Embodiment 1, the adsorption of Hg by the activated carbon injection system 12 is enabled by the preceding removal of the sulfur trioxide ($SO_3$) by the basic substance injection system 11. Furthermore, with the present system, the basic substance injection system 11 and the activated carbon injection system 12 are disposed at the exhaust gas flow channels at the downstream side of the dry electric precipitator 6 and the upstream side of the wet desulfurizer 8. Thus, unlike the system shown in FIG. 1, ash, which does not contain the basic substance, containing a sodium (Na) component or a potassium (K) component, and reaction products, can be recovered at the dry electric precipitator 6.

INDUSTRIAL APPLICABILITY

The present invention is high in industrial applicability as an exhaust gas treating system that treats a coal combustion exhaust gas, containing a high concentration of sulfur, at a high desulfurization rate without discharging heavy metals.

BRIEF DESCRIPTION OF THE DRAWINGS

FIG. 4 shows an example of relationships of the activated carbon injection rates and an Hg removal rates according to sulfur trioxide ($SO_3$) concentrations of the exhaust gas purifying system according to the present invention.

DESCRIPTION OF SYMBOLS

Figure 1:
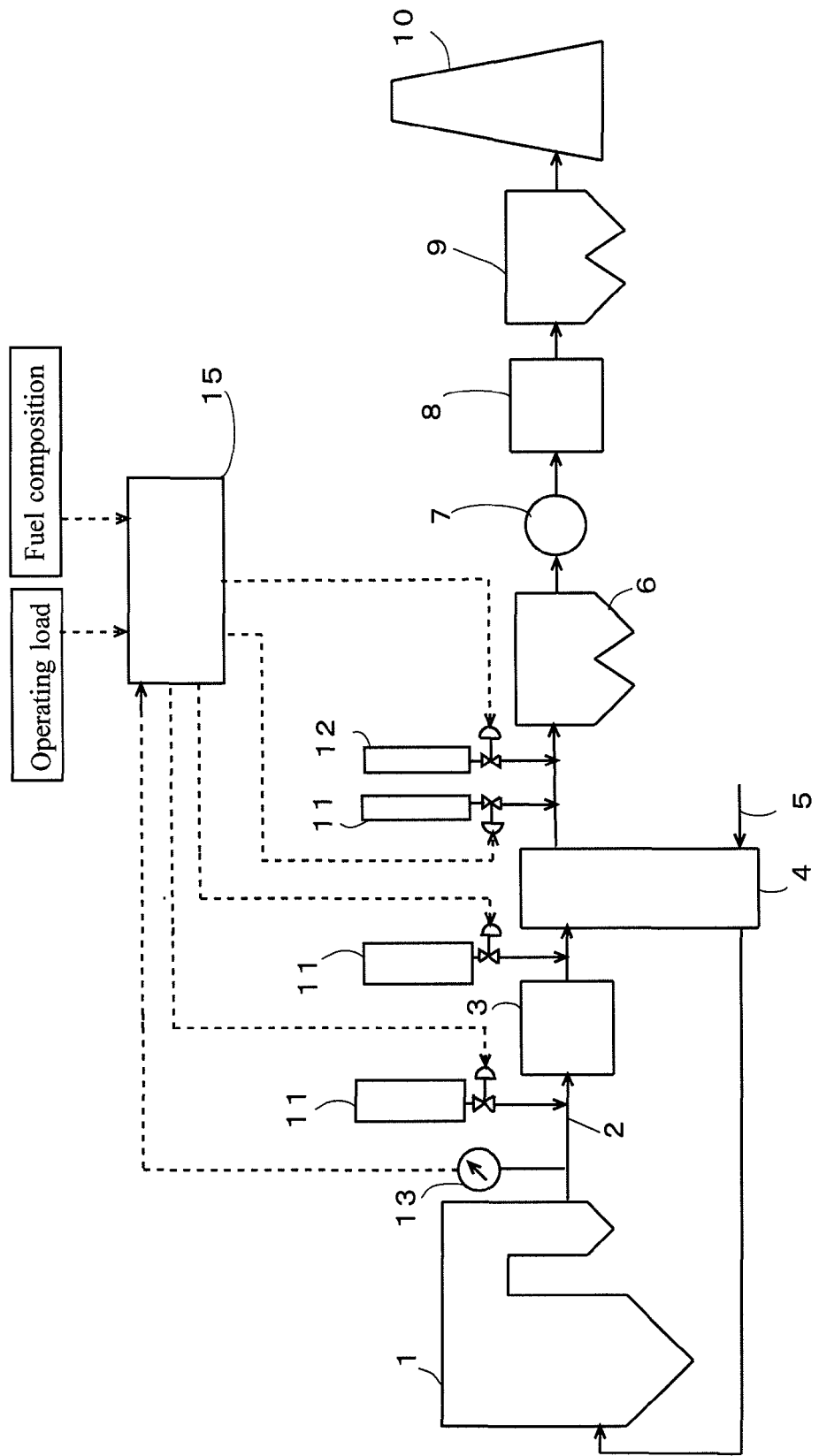
FIG. 1 is an overall system diagram of an exhaust gas purifying system according to Embodiment 1 of the present invention.
Figure 2:
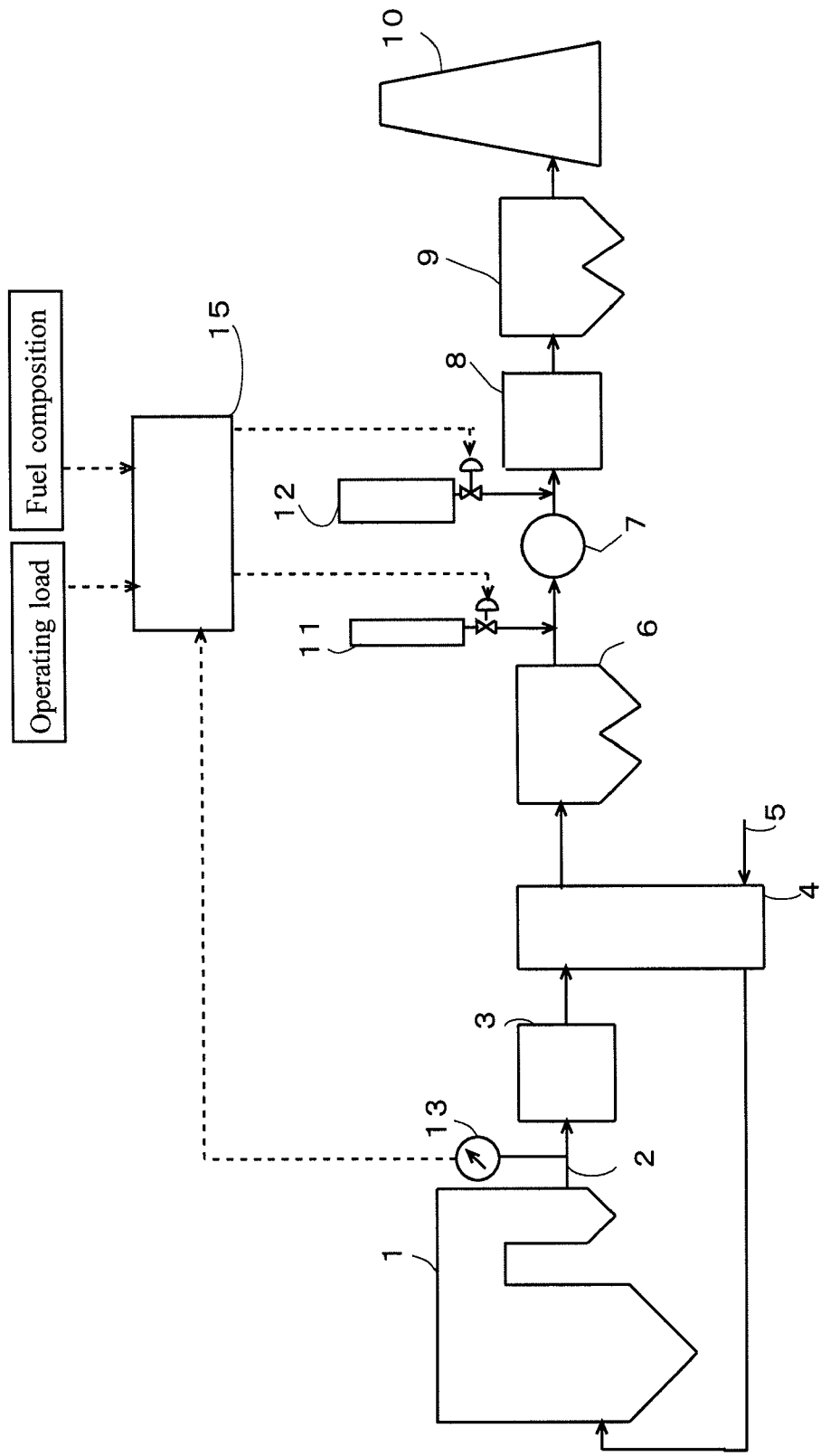
FIG. 2 is an overall system diagram of an exhaust gas purifying system according to Embodiment 2 of the present invention.
Figure 3:
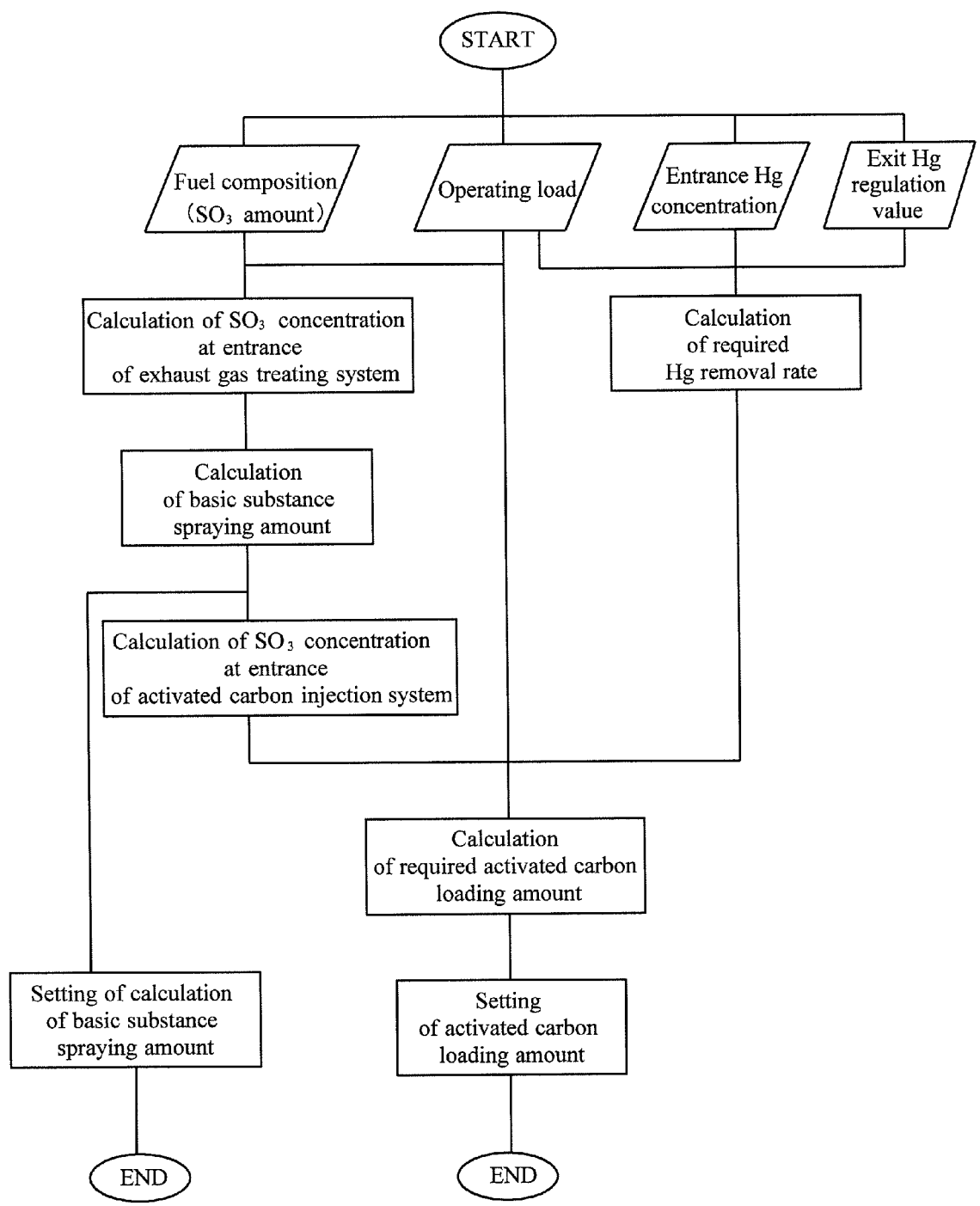
FIG. 3 is a control flowchart of a basic substance spraying amount and an activated carbon injection rate of the exhaust gas purifying system according to Embodiments 1 and 2 of the present invention.
Figure 5:
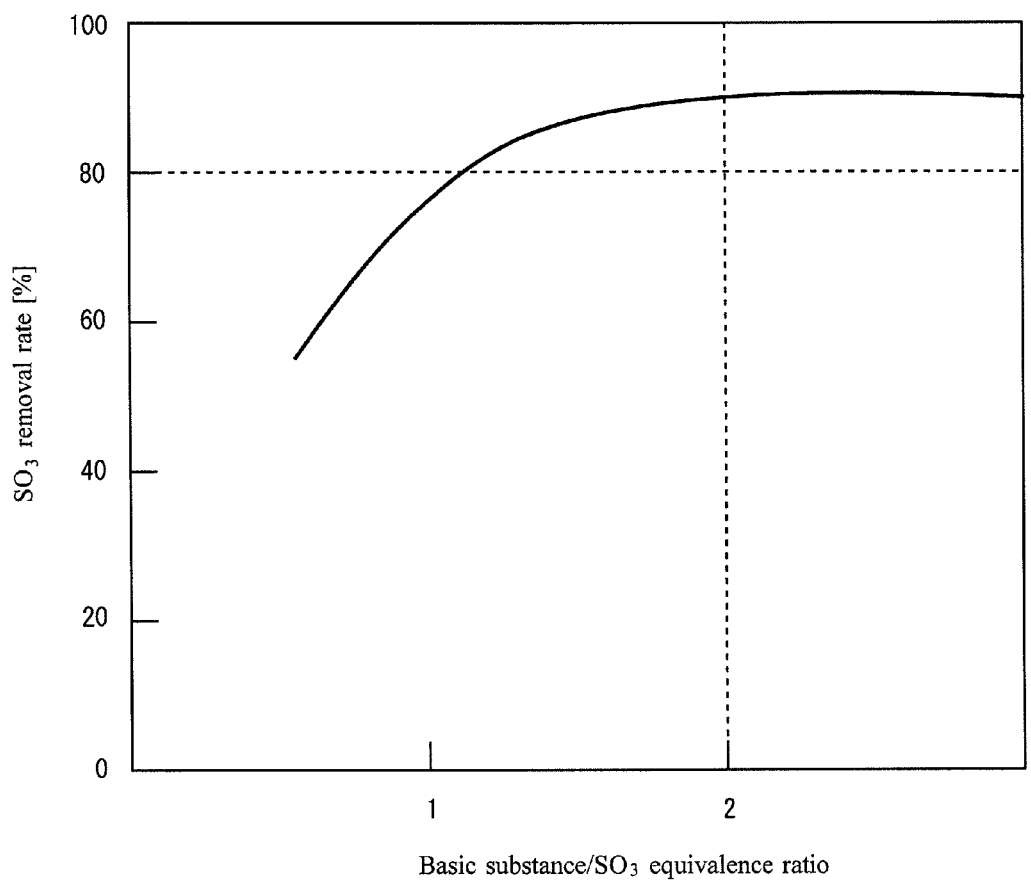
FIG. 5 shows an example of a relationship of a spraying amount of basic substances and a sulfur trioxide ($SO_3$) removal rate of the exhaust gas purifying system according to the present invention.
Figure 6:
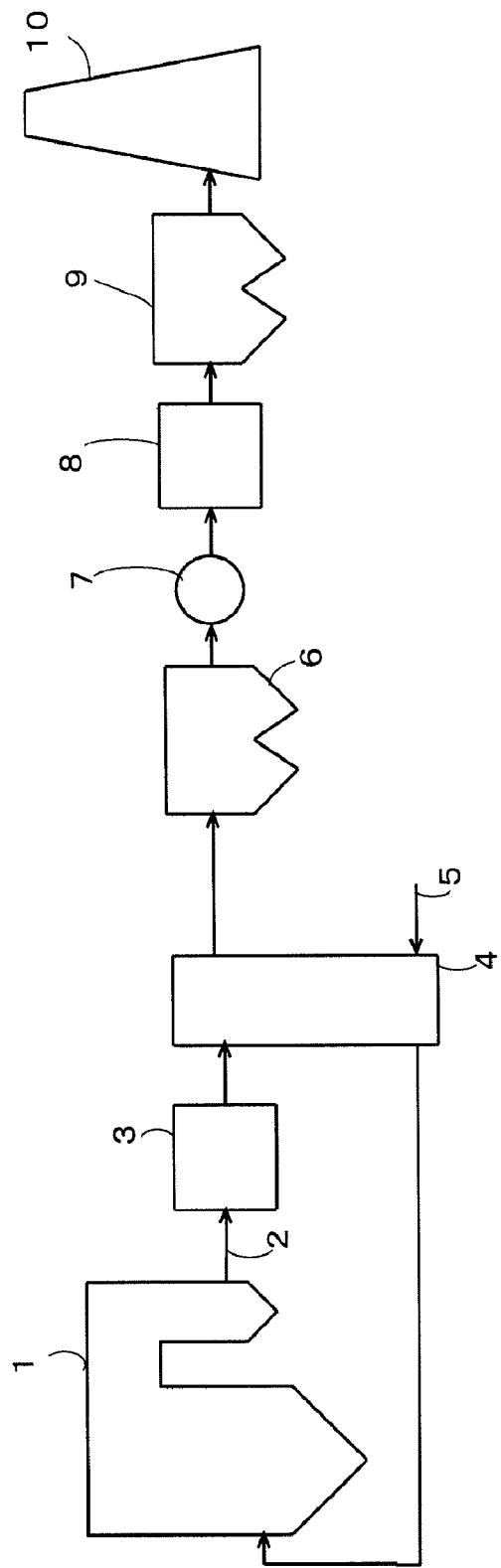
FIG. 6 is a system diagram of an example of an exhaust gas treating system according to a prior art.
Figure 7:
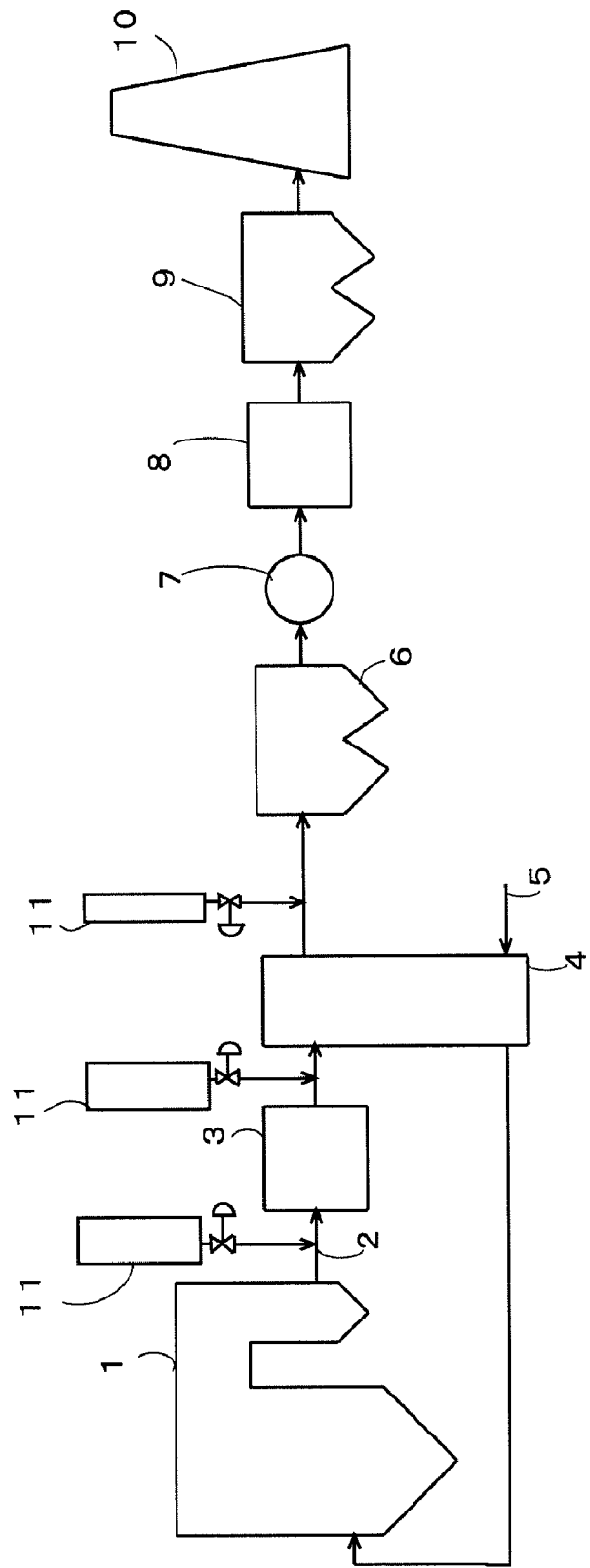
FIG. 7 is a system diagram of an example of an exhaust gas treating system according to a prior art in which basic substance injection systems are installed.
Figure 8:
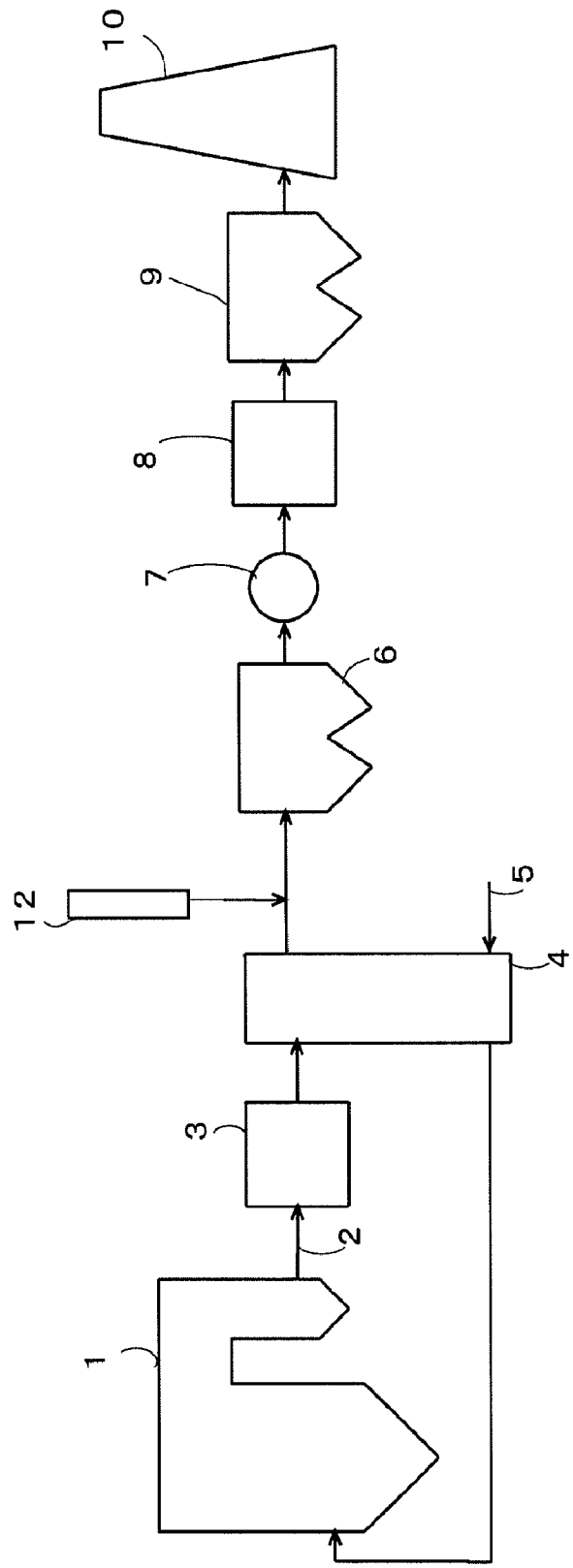
FIG. 8 is a system diagram of an example of an exhaust gas treating system according to a prior art in which an activated carbon injection system is installed.

1 boiler
2 exhaust gas
3 NOx removal equipment
4 air preheater
5 combustion air
6 dry electric precipitator
7 induction fan
8 wet desulfurizer
9 wet electric precipitator
10 chimney
11 basic substance injection system
12 activated carbon injection system
13 mercury (Hg) concentration meter
15 controller

What is claimed is:

1. An exhaust gas purifying method including the steps of: removing sulfur trioxide ($SO_3$) by spraying a basic substance in a flow channel of an exhaust gas discharged from a combustion apparatus that includes a boiler; thereafter removing soot/dust in the exhaust gas by a dry precipitator; then removing sulfur dioxide ($SO_2$) in the exhaust gas by a desulfurizer; further removing sulfur trioxide ($SO_3$) and soot/dust remaining in the exhaust gas by a wet precipitator; and then discharging the purified exhaust gas into air; and wherein the basic substance and a heavy metal adsorbent, sprayed into the exhaust gas to remove heavy metals contained in the exhaust gas, are sprayed into an exhaust gas flow channel at a downstream side of the dry precipitator and an upstream side of the desulfurizer.

2. The exhaust gas purifying method according to claim 1, further comprising the steps of: predicting a sulfur trioxide ($SO_3$) concentration in the exhaust gas from an operating load of the combustion apparatus and a composition of a fuel used in the combustion apparatus; computing a basic substance spraying amount in accordance with the predicted value of the sulfur trioxide ($SO_3$) concentration to set the amount of basic substance sprayed into the exhaust gas; and, at the same time, calculating a required heavy metal removal rate from the operating load, a heavy metal concentration in the exhaust gas, and a regulation value of heavy metal concentration in the exhaust gas after the exhaust gas purifying treatment; and setting a heavy metal adsorbent spraying amount required to be sprayed into the exhaust gas from relationships of the heavy metal adsorbent spraying amount and the heavy metal removal rate that are determined in advance according to the sulfur trioxide ($SO_3$) concentration.

3. An exhaust gas purifying apparatus comprising: a basic substance injection system, spraying a basic substance for removing sulfur trioxide ($SO_3$) into a flow channel for an exhaust gas discharged from a combustion apparatus that includes a boiler; a dry precipitator for removing soot/dust in the exhaust gas; a desulfurizer, removing sulfur dioxide ($SO_2$) in the exhaust gas after collection of the soot/dust by the dry precipitator; a wet precipitator for removing sulfur trioxide ($SO_3$) and soot/dust remaining in the exhaust gas; and a chimney, discharging the desulfurized exhaust gas into air; and wherein the basic substance injection system and a heavy metal adsorbent injection system are installed at an exhaust gas flow channel at a downstream side of the dry precipitator and an upstream side of the desulfurizer.

4. The exhaust gas purifying apparatus according to claim 3, further comprising a controller, in turn comprising:

a sulfur trioxide ($SO_3$) concentration predicting unit, predicting a sulfur trioxide ($SO_3$) concentration in the exhaust gas based on an operating load of the combustion apparatus and a composition of a fuel used in the combustion apparatus;

a basic substance spraying amount setting unit, setting a basic substance spraying amount in accordance with the predicted value of the sulfur trioxide ($SO_3$) concentration predicted by the sulfur trioxide ($SO_3$) concentration predicting unit;

a unit measuring a heavy metal concentration in the exhaust gas at an exit of the combustion apparatus;

a required heavy metal concentration removal rate calculating unit, calculating a required heavy metal concentration removal rate, determined by a heavy metal concentration from the heavy metal concentration measuring unit and the load of the combustion apparatus from the load measuring unit, and a priorly established regulation value of heavy metal concentration in the exhaust gas after the exhaust gas purifying treatment; and a spraying amount setting unit, computing a heavy metal adsorbent spraying amount from the computed sulfur trioxide ($SO_3$) concentration prediction value at an exhaust gas entrance and the required heavy metal concentration removal rate, calculated by the required heavy metal concentration removal rate calculating unit, and using relationships of a heavy metal adsorbent spraying amount and the heavy metal removal rate, which are determined in advance according to sulfur trioxide ($SO_3$) concentration, to set the heavy metal adsorbent spraying amount and spraying that amount into the exhaust gas.

* * * * *

UNITED STATES PATENT AND TRADEMARK OFFICE
CERTIFICATE OF CORRECTION

| | | |
|---|---|---|
| PATENT NO. | : 8,167,975 B2 | Page 1 of 1 |
| APPLICATION NO. | : 12/531603 | |
| DATED | : May 1, 2012 | |
| INVENTOR(S) | : Shimamura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this
Fourteenth Day of August, 2012

David J. Kappos
*Director of the United States Patent and Trademark Office*